(12) United States Patent
Subhreveti et al.

(10) Patent No.: US 12,411,942 B2
(45) Date of Patent: Sep. 9, 2025

(54) SECURING FUNCTION AS A SERVICE CLOUD COMPUTING ENVIRONMENTS

(71) Applicant: CrowdStrike, Inc., Sunnyvale, CA (US)

(72) Inventors: Dinesh Subhreveti, San Jose, CA (US); Ramesh Kumar, Delhi (IN)

(73) Assignee: CrowdStrike, Inc., Sunnyvale, CA (US)

( * ) Notice: Subject to any disclaimer, the term of this patent is extended or adjusted under 35 U.S.C. 154(b) by 338 days.

(21) Appl. No.: 17/974,868

(22) Filed: Oct. 27, 2022

(65) Prior Publication Data

US 2024/0143740 A1 May 2, 2024

(51) Int. Cl.
  G06F 21/55 (2013.01)
  G06F 21/56 (2013.01)
  G06F 21/62 (2013.01)

(52) U.S. Cl.
  CPC ........... *G06F 21/552* (2013.01); *G06F 21/55* (2013.01); *G06F 21/566* (2013.01); *G06F 21/6209* (2013.01); *G06F 2221/034* (2013.01)

(58) Field of Classification Search
  CPC ...... G06F 21/552; G06F 21/55; G06F 21/566; G06F 21/6209; G06F 2221/034; G06F 21/52; G06F 21/53; G06F 21/554
  See application file for complete search history.

(56) References Cited

U.S. PATENT DOCUMENTS

| | | | |
|---|---|---|---|
| 11,070,573 B1* | 7/2021 | Edwards | G06F 11/3636 |
| 11,217,343 B2* | 1/2022 | Lee | A63B 24/0075 |
| 2020/0186445 A1* | 6/2020 | Govindaraju | H04L 67/34 |
| 2021/0264020 A1* | 8/2021 | LeMay | G06F 21/53 |

* cited by examiner

*Primary Examiner* — Hany S. Gadalla
(74) *Attorney, Agent, or Firm* — Womble Bond Dickinson (US) LLP (57) ABSTRACT

A system and method of securing a Function as a Service (FaaS) cloud computing system without using access rights to operating system (OS) kernels of the cloud service system. The method includes receiving a request to invoke a user-function associated with a computing language. The method includes executing the user-function within an operating system that executes on a processing device of the cloud service system. The method includes monitoring, by the processing device, a real-time behavior of the user-function using a security sensor that executes within the operating system, wherein the security sensor is without access rights to a kernel of the operating system. The method includes acquiring behavioral data indicative of the real-time behavior of the user-function.

20 Claims, 6 Drawing Sheets

400 receiving a request to invoke a user-function associated with a computing language
402 executing the user-function within an operating system that executes on a processing device of the cloud service system
404 monitoring, by the processing device, a real-time behavior of the user-function using a security sensor that executes within the operating system, wherein the security sensor is without access rights to a kernel of the operating system
406 acquiring behavioral data indicative of the real-time behavior of the user-function
408

SECURING FUNCTION AS A SERVICE CLOUD COMPUTING ENVIRONMENTS

TECHNICAL FIELD

The present disclosure relates generally to cloud computing environments, and more particularly, to systems and methods of securing a Function as a Service (FaaS) cloud computing system without using access rights to operating system (OS) kernels of the cloud service system.

BACKGROUND

Cloud service systems are infrastructure, platforms, or software that are hosted by third-party providers and made available to users through the internet. Cloud services facilitate the flow of user data from front-end clients (e.g., servers, tablets, desktops, laptops—anything on the client's end), through the internet, to the provider's systems, and back. Clients can access cloud services with nothing more than a computer, operating system, and internet connectivity or virtual private network (VPN).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Function as a Service (FaaS) is a rapidly growing application deployment model for cloud service systems. Unlike more general environments based on virtual machines or containers, cloud-managed function service offerings are extremely restrictive. Specifically, the function is accessed through narrow bespoke interfaces and only available to unprivileged software. However, this renders conventional endpoint security software that is built for general endpoints unfit. As a result, FaaS environments are often exposed to higher risk of attacks, which may steal application data or may also excessively consume the computing resources (e.g., memory resources, power resources, processing resources, networking resources) of the cloud service system. Thus, there is a long-felt but unsolved need to solve the problems of securing a cloud service system amid these restrictions.

Aspects of the present disclosure address the above-noted and other deficiencies by monitoring calls and events of applications running in an FaaS cloud service system without using access rights to the operating system (OS) kernels of the cloud service system. Benefits of the embodiments of the present disclosure may include a protection against application data theft or protection against wastage of computing resources (e.g., memory resources, power resources, processing resources, networking resources) of the cloud service system occurred because of potential compromises otherwise.

As discussed in greater detail below, the cloud service system leverages Linux kernel's seccomp mechanism, which provides the ability to monitor applications running on the FaaS environments without requiring privilege. When using the seccomp mechanism, the FMS sensor is started alongside the application/function that is being monitored, and the application/function runtime itself is started under a special shell that initializes the seccomp mechanism before servicing function requests. Here, the FMS sensor is pre-registered as an external extension of an interface supported by the FaaS provider and the special shell is preregistered as the internal extension of the interface.

The cloud service system may use internal extensions and/or external extensions to augment a user-function. An external extension runs as an independent process in the execution environment and continues to run after the user-function invocation is fully processed. Because extensions run as separate processes, they may be written in a different computing language than the user-function. Conversely, an internal extension runs as part of the runtime process. The user-function accesses internal extensions by using wrapper scripts or in-process mechanisms (e.g., JAVA_TOOL_OPTIONS).

In an illustrative embodiment, a cloud service system receives a user-function execution request from a client device to invoke a user-function associated with a computing language. The cloud service system redirects the user-function execution request to a host machine of the cloud service system. The host machine executes the user-function within an operating system. The FMS sensor monitors a real-time behavior of the user-function that is executed within the operating system, where the FMS sensor is without access rights to a kernel of the operating system. The FMS sensor generates behavioral data that is indicative of the real-time behavior of the user-function.

Figure 1:
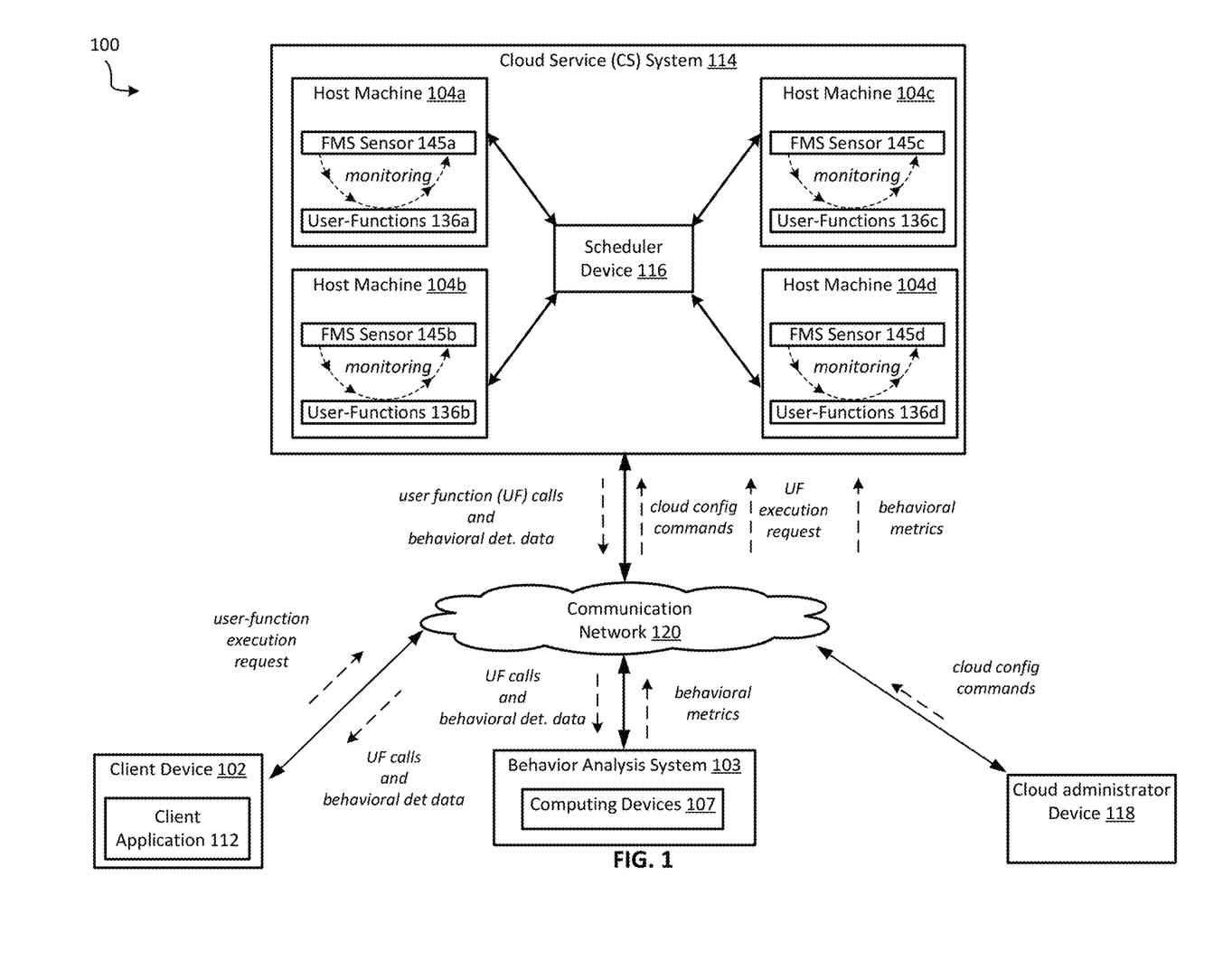
FIG. 1 is a block diagram depicting an example environment for securing a FaaS cloud computing system without using access rights to operating system (OS) kernels of the cloud service system, according to some embodiments.

FIG. 1 is a block diagram depicting an example environment for securing a FaaS cloud computing system without using access rights to operating system (OS) kernels of the cloud service system, according to some embodiments. The environment 100 includes a cloud service system 114, a client device 102, a behavior analysis system 103, and a cloud administrator device 118 that are each communicably coupled together via the communication network. The client device 102 executes a client application 112 that is configured to send (e.g., provide, transmit, submit) to the cloud service system 114 one or more requests (shown in FIG. 1 as, "function execution request") to execute a particular user-function on one or more of the host machines 104, where the user-function is associated with one or more computing languages (e.g., Java, C++, Python).

An administrator of the cloud service system 114 may use the cloud administrator device 118 to configure and/or manage (e.g., controls, operates) the cloud service system 114 by sending commands (shown in FIG. 1 as, "cloud configuration commands") to the cloud service system 114. The cloud configuration commands may configure the cloud service system 114 to monitor (in real-time) one or more user-functions that execute on the cloud service system 114. For example, as discussed herein, a cloud configuration command may cause the cloud service system 114 to associate an internal extension of a runtime system of the cloud service system 114 with a function monitoring security (FMS) initializer and an external extension of the runtime system with an FMS sensor (e.g., security sensor). In some embodiments, the cloud configuration commands include one or more user-functions for the cloud service system 114 to locally store. In some embodiments, the client application 112 is included in a container that is associated with a Docker platform. In some embodiments, the client application 112 is included in a Pod associated with a Kubernetes platform.

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g. cell towers), etc. The communication network 120 may carry communications (e.g., data, message, packets, frames, etc.) between any other the computing device.

The cloud service system 114 includes host machines 104a, 104b, 104c, 104d (collectively referred to as, "host machines 104") and a scheduler device 116 that are each communicably connected to one another via the communication network 120 to form a cloud service system for providing services and/or computing resources (collectively referred to as, "services" or "cloud services") to the client device 102, which are used to process the user-function execution request that are submitted from the client application 112. The cloud service system 114 may provide any type of cloud service and/or computing resource including, for example, networking services, block storage services, computing services, object storage services, database services, communication services, deployment and management services, monitoring services, telemetry services, queuing services, collaboration services, application services, and the like.

A cloud service system 114 may provide the cloud services and/or cloud resources to the client device 102 by executing one or more user-functions. For example, host machine 104a executes one or more user-functions 136a, host machine 104b executes one or more user-functions 136b, host machine 104c executes one or more user-functions 136c, and host machine 104d executes one or more user-functions 136d. Each host machine 104 may locally store the user-functions in storage (e.g., memory, hard drive).

The cloud service system 114 may be any type of cloud service. In some embodiments, the cloud service may be an Infrastructure-as-a-Service (IaaS) that provides users with compute, networking, and storage resources. Some examples include Open Stack, xSphere, and Azure Stack Virtual Machines. In some embodiments, the cloud service may be an Application Platform-as-a-Service (PaaS/aPaaS) that provides users with a platform on which applications can run, as well as the information technology (IT) infrastructure for it to run. Some examples include Cloud-Foundry, OpenShift, and WaveMaker RAD. In some embodiments, the cloud service may be a Software-as-a-Service (SaaS) that provides users with a cloud application, the platform on which it runs, and the platform's underlying infrastructure. An example includes BYO. In some embodiments, the cloud service may be a Function-as-a-Service (FaaS) that is an event-driven execution model that lets the developers build, run, and manage application packages as functions without maintaining the infrastructure. Some examples include OpenWhisk, Fission, and Iron.io. In some embodiments, the cloud service may be a Container Platform (CaaS) that provides users with a platform on which to execute containers. Some examples include Kubernetes, DC/OS, Docker Datacenter.

The behavior analysis system 103 includes one or more computing devices 107 that each include machine learning (ML) capabilities. The behavior analysis system 103 may be owned by the same owner (or may be a vendor) who owns the FMS sensor and/or FMS initializer. The behavior analysis system 103 may be present in a computer network that is the same or different from the computer network (shown in FIG. 1 as, communication network 120) in which host machines 104 are running. The FMS sensor may send behavioral detection data to the behavior analysis system 103 for various analysis. For example, one or more of the computing devices 107 may use the behavioral detection data to generate behavioral metrics and send the behavioral metrics to the FMS sensor. The FMS sensor may use the behavioral metrics to decide whether future user requests are malicious or not.

A host machine 104, a scheduler device 116, a client device 102, and a cloud administrator device may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may comprise a single machine or may include multiple interconnected machines (e.g., multiple servers configured in a cluster).

A host machine 104 may be one or more virtual environments. In one embodiment, a virtual environment may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.). The cloud service system 114 may use the same type or different types of virtual environments. For example, all of the host machines 104 may be VMs. In another example, all of the host machines 104 may be containers. In a further example, some of the host machines 104 may be VMs, other host machines 104 may be containers, and other host machines 104 may be computing devices (or groups of computing devices).

Each host machine 104 executes an FMS sensor 145. Specifically, the host machine 104a executes an FMS sensor 145a, the host machine 104b executes an FMS sensor 145b, the host machine 104c executes an FMS sensor 145c, and the host machine 104d executes an FMS sensor 145d. The FMS sensor 145 monitors the activity (e.g., calls, behavior) of the user-functions 136 that are executing on the same operating system to which the FMS sensor 145 is also executing upon. By monitoring the activity of the user-functions 136, the FMS sensor is able to generate behavioral data that in indicative of the user-function without using access rights to access/modify a kernel of the operating system.

The scheduler device 116 is configured to receive a user-function execution request from the client application 112 that is executing on the client device 102, determine which host machine 104 within the cloud service system 114 is able to process the user-function execution request, and forward the user-function execution request to the host machine 104 that is able to process the user-function execution request. Each host machine 104 is configured to send a message to the scheduler device 116 to expose an application programming interface (API) to the services, resources (e.g., processor, storage, and/or cache memory, etc.), and user-functions 136 that are provided by the host machine 104. The scheduler device 116 determines which host machine 104 is capable of processing/performing the user-function execution request based on the exposure messages that the scheduler device 116 receives from each of the host machines 104 within the cloud service system 114.

Still referring to FIG. 1, the scheduler device 116 receives a user-function execution request to invoke a user-function associated with a computing language. The scheduler device 116 redirects the user-function execution request to a host machine 104. The host machine 104 executes the user-function within an operating system that executes on the host machine 104. The FMS sensor 145 monitors a real-time behavior of the user-function using a seccomp mechanism that is already set up by a pre-registered internal extension within the operating system, and does so without having access rights to a kernel of the operating system. The FMS sensor 145 generates behavioral data that is indicative of the real-time behavior of the user-function.

Although FIG. 1 shows only a select number of cloud service systems (e.g., cloud service system 114) and computing devices (e.g., host machines 104, client devices 102, cloud administrator device 118); the environment 100 may include any number of cloud service systems and computing devices that are interconnected in any arrangement to facilitate the exchange of data between the cloud service systems and computing devices.

Figure 2A:
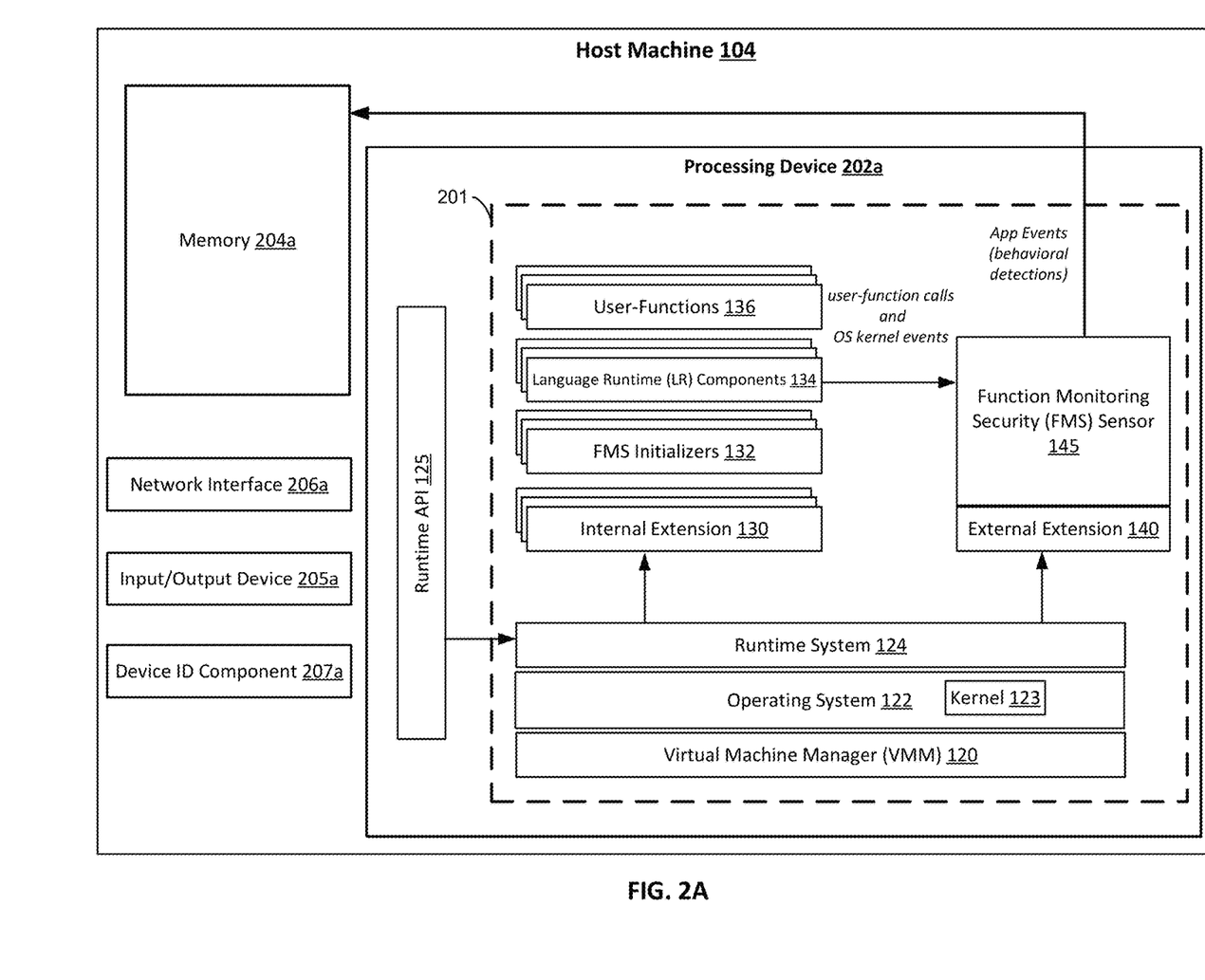
FIG. 2A is a block diagram depicting an example of the host machine 104 in FIG. 1 implementing the function monitoring security (FMS) sensor 145.

FIG. 2A is a block diagram depicting an example of the host machine 104 in FIG. 1 implementing the function monitoring security (FMS) sensor 145, according to some embodiments. While various devices, interfaces, and logic with particular functionality are shown, it should be understood that the host machine 104 includes any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The host machine 104 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may comprise one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the host machine 104. In some embodiments, the processing device 202a and the memory 204a form various processing devices and/or circuits described with respect to the host machine 104. The instructions include code from any suitable computer programming language such as, but not limited to, C, C++, C#, Java, JavaScript, VBScript, Perl, HTML, XML, Python, TCL, and Basic.

A backend (not shown in FIG. 2A) of the CS system 114 may be configured to create a sandbox 201 that includes a runtime API 125, a Virtual Machine Manager (VMM) 120, an operating system 122, a runtime system 124, one or more internal extensions 130 that are respectively associated with one or more function monitoring security (FMS) initializers 132, one or more language runtime (LR) components 134 that are each associated with a respective computing language, one or more user functions 136 that are each associated with a respective computing language, and/or an external extension 140 that is associated with a FMS sensor 145.

The processing device 202a may be configured to execute a virtual machine manager (VMM) 120 that executes an operating system 122. The operating system 122 includes a kernel 123 (e.g., Linux, Zircon, Windows NT kernel, etc.) that is a computer program that has complete control over the operating system 122. The kernel 123 is the portion of the operating system code that stays resident in memory, and facilitates interactions between hardware and software components on the host machine 104. The kernel 123 is one of the first programs loaded on startup (e.g., after the bootloader). The kernel 123 handles the rest of startup as well as memory, peripherals, and input/output (I/O) requests from software, translating them into data-processing instructions for the processing device 202a. The kernel 123 may be any type of kernel including, for example, a monolithic kernel, a microkernel, a hybrid kernel, or an exokernel.

The processing device 202a may be configured to execute a runtime API 125 and a runtime system 124 (e.g., Lambda Runtime) within the operating system 122. The runtime system 124 receives requests (shown in FIG. 1 as, "user-function execution request") to invoke one or more user-functions 136 on the processing device 202a of the host machine 104. The processing device 202 may be configured to retrieve the one or more user-functions 136 from its local storage (e.g., memory 204a) or receive the one or more user-functions 136 from the client device 102 (e.g., as included in the user-function execution request) or the cloud administrator device 118.

The runtime system 124 includes an internal extension 130 and an external extension 140. An FMS initializer 132 (e.g., seccomp shell, a seccomp agent, a seccomp program) may be pre-registered with the internal extension 130 to cause the runtime system 124 to launch (e.g., start, invoke, execute) and maintain execution of the FMS initializer 132 responsive to receiving a request to invoke a user-function. A FMS sensor 145 (e.g., seccomp in the Linux kernel, which is a computer security facility) may be pre-registered with the external extension 140 to cause the runtime system 124 to launch and maintain execution of the FMS sensor 145 responsive to receiving a request to invoke one or more user-functions 136.

Figure 3:
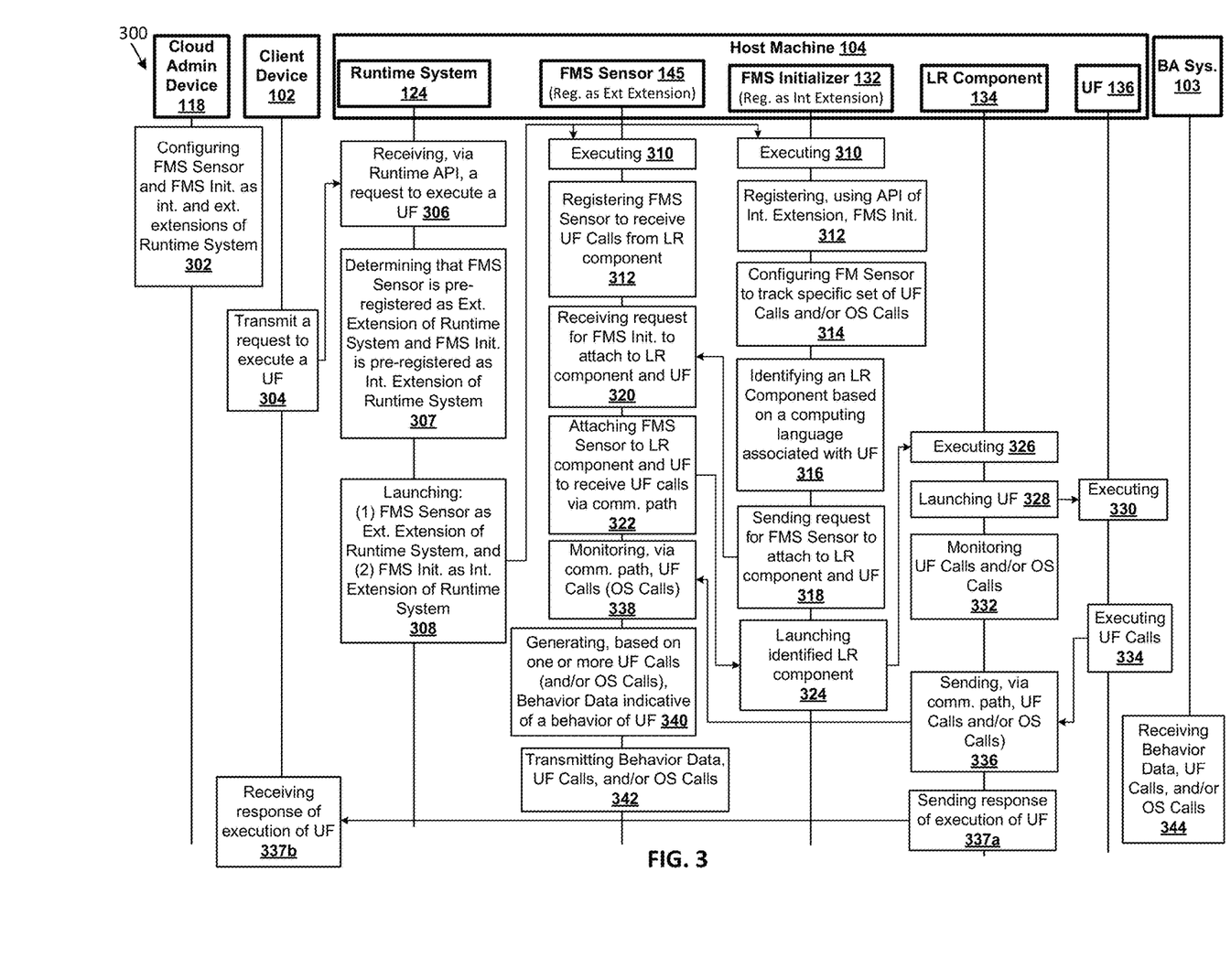
FIG. 3 is a signaling diagram depicting a procedure for securing a FaaS cloud computing system without using access rights to operating system (OS) kernels of the cloud service system, according to some embodiments.

The FMS sensor 145 may be configured to secure the cloud service system 114 without using privileges (e.g., access rights) to access and/or modify operating system (OS) kernels of the cloud service system 114. For example, FIG. 3 is a signaling diagram depicting a procedure for securing a FaaS cloud computing system without using access rights to operating system (OS) kernels of the cloud service system, according to some embodiments. The signaling diagram shows the signals and operations of the cloud administrator device 118, the client device 102, the behavioral analysis system 103, and the host machine 104; where the host machine 104 includes (or executes) the runtime system 124, the FMS sensor 145, the FMS initializer 132, a particular LR component 134, and particular user-function 136. In some embodiments, the FMS sensor 145 may be configured to simultaneously execute a plurality of user-functions 136 and/or at plurality of LR components 134 at the same time.

At operation 306, the runtime system 124 receives, via the runtime API 125, a request to execute a particular user-function 136, where the user-function 136 is associated with one or more computer languages (e.g., Java, C++, Python, etc.). At operation 307, the runtime system 124 determines that the FMS sensor 145 is pre-registered as the external extension 140 of runtime system 124 and FMS initializer 132 is pre-registered as the internal extension 130 of runtime system 124.

At operation 308, the runtime system 124 launches the FMS sensor 145 as the external extension 140 of runtime system 124 to cause the processing device 202a to execute the FMS sensor 145 at operation 310. At operation 308, the runtime system 124 also launches the FMS initializer 132 as the internal extension 130 of the runtime system 124 to cause the processing device 202a to execute the FMS initializer 132 at operation 310.

At operation 312, the FMS sensor 145 registers itself using an API of the external extension 140 in order to receive user-function calls from the LR component 134, where the LR component 134 is associated with the one or more computing languages of the particular user-function 136 (as indicated in the user-function execution request). In some embodiments, the runtime system 124 or the FMS sensor 145 (operation 316) may identify the particular user-function 136 from the plurality of user-functions 136 based on the one or more computing languages of the particular user-function 136. If the runtime system 124 identifies the particular user-function 136, then the runtime system 124 includes an identifier to the particular user-function 136 in its launching message (operation 308) that it sends to the FMS sensor 145.

At operation 312, the FMS initializer 132 also registers itself with the CS system 114 and/or the cloud administrator device 118 using an API of the internal extension 130.

At operation 314, the FMS initializer 132 configures the FM sensor 145 to track a particular set of user-function calls that originate from the user-function. A user-function call may include, for example, a process control call (e.g., create process, terminate process, load/execute, get/set process attributes, wait for time, wait event, signal event, allocate memory, and free memory), a file management call (e.g., create file, delete file, open/close file, read/write file, reposition/move file, get/set file attributes), a device management call (e.g., request device, release device, read, write, reposition, get/set device attributes, logically attach or detach devices), an information management call (e.g., get/set total system information, get/set process, file, or device metadata), a communication call (e.g., create/delete communication connection, send/receive messages, transfer status information, attach or detach remote devices), and/or a protection call (e.g., get/set file permission).

In some embodiments, the FM sensor 145 may also track a particular set of OS calls to/from the operating system 122. An OS call may be a process control call, a file management call, a device management call, an information management call, a communication call, and/or protection call. In some embodiments, the FM sensor 145 may also track a particular set of OS events associated with the operating system 122. An OS event is anything that indicates a status (e.g., error state, etc.) of the operating system 122.

At operation 316, the FMS initializer 132 identifies the particular user-function 136 from the plurality of user-functions 136 based on the one or more computing languages of the particular user-function 136.

At operation 318, the FMS initializer 132 sends a request to the FMS sensor 145 for the FMS sensor 145 to attach to the LR component 134 and the user-function 136. At operation 320, the FMS sensor 145 receives the request from the FMS initializer 132.

At operation 322, the FMS sensor 145 attaches, responsive to receiving the request, the FMS sensor 145 to the LR component 134 and the user-function 136 via a communication path that allows the FMS sensor 145 to receive user-function calls associated with the user-function 136 and/or OS calls associated with the operating system 122.

At operation 324, the FMS initializer 132 launches the previously identified LR component 134, to cause the processing device 202a to execute the LR component 134 at operation 326. At operation 328, the LR component 134 launches the user-function 136 (as identified in the user-function execution request) to cause the processing device 202a to execute the user-function 136 at operation 330.

At operation 332, the LR component 134 monitors the user-function 136 to capture user-function calls. In some embodiments, and the LR component 134 also monitors the operating system 122 to capture OS calls. At operation 334, the user function 136 issues one or more user-function calls.

At operation 336, the LR component 134 sends, via the communication path, one or more user-function calls (and one or more OS calls) to the FM sensor 145.

At operation 337a, the LR component 134 sends the response of the execution of the user-function 136 to the client device 102. At operation 337b, the client device 102 receives the response of the execution of the user-function 136 from the LR component 134.

At operation 338, the FM sensor 145 monitors, via the communication path, the one or more user-function calls (and one or more OS calls).

At operation 340, the FMS sensor 145 generates, based on the one or more user-function calls (and/or the OS calls), behavior data that is indicative of one or more behaviors of the user-function 136. In some embodiments, the behavior data may indicate whether the user-function execution request is malicious or non-malicious.

At operation 342, the FMS sensor 145 may transmit the behavior data, the one or more user-function calls, and/or the one or more OS calls to a behavior analysis system 103. At operation 344, the behavioral analysis system 103 receives the behavior data, the one or more user-function calls, and/or the one or more OS calls from the FMS sensor 145.

Referring back to FIG. 2A, the host machine 104 includes a network interface 206a configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the host machine 104 includes a plurality of network interfaces 206a of different types, allowing for connections to a variety of networks, such as local area networks (public or private) or wide area networks including the Internet, via different sub-networks.

The host machine 104 includes an input/output device 205a configured to receive user input from and provide information to a user. In this regard, the input/output device 205a is structured to exchange data, communications, instructions, etc. with an input/output component of the host machine 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of host machine 104, such as a built-in display, touch screen, microphone, etc., or external to the housing of host machine 104, such as a monitor connected to host machine 104, a speaker connected to host machine 104, etc., according to various embodiments. In some embodiments, the host machine 104 includes communication circuitry for facilitating the exchange of data, values, messages, and the like between the input/output device 205a and the components of the host machine 104. In some embodiments, the input/output device 205a includes machine-readable media for facilitating the exchange of information between the input/output device 205a and the components of the host machine 104. In still another embodiment, the input/output device 205a includes any combination of hardware components (e.g., a touch-screen), communication circuitry, and machine-readable media.

The host machine 104 includes a device identification component 207a (shown in FIG. 2A as device ID component 207a) configured to generate and/or manage a device identifier associated with the host machine 104. The device identifier may include any type and form of identification used to distinguish the host machine 104 from other computing devices. In some embodiments, to preserve privacy, the device identifier may be cryptographically generated, encrypted, or otherwise obfuscated by any device and/or component of host machine 104. In some embodiments, the host machine 104 may include the device identifier in any communication (e.g., remedial action messages, etc.) that the host machine 104 sends to a computing device.

The host machine 104 includes a bus (not shown), such as an address/data bus or other communication mechanism for communicating information, which interconnects the devices and/or components of host machine 104, such as processing device 202a, network interface 206a, input/output device 205a, and device ID component 207a.

In some embodiments, some or all of the devices and/or components of host machine 104 may be implemented with the processing device 202a. For example, the host machine 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

Figure 2B:
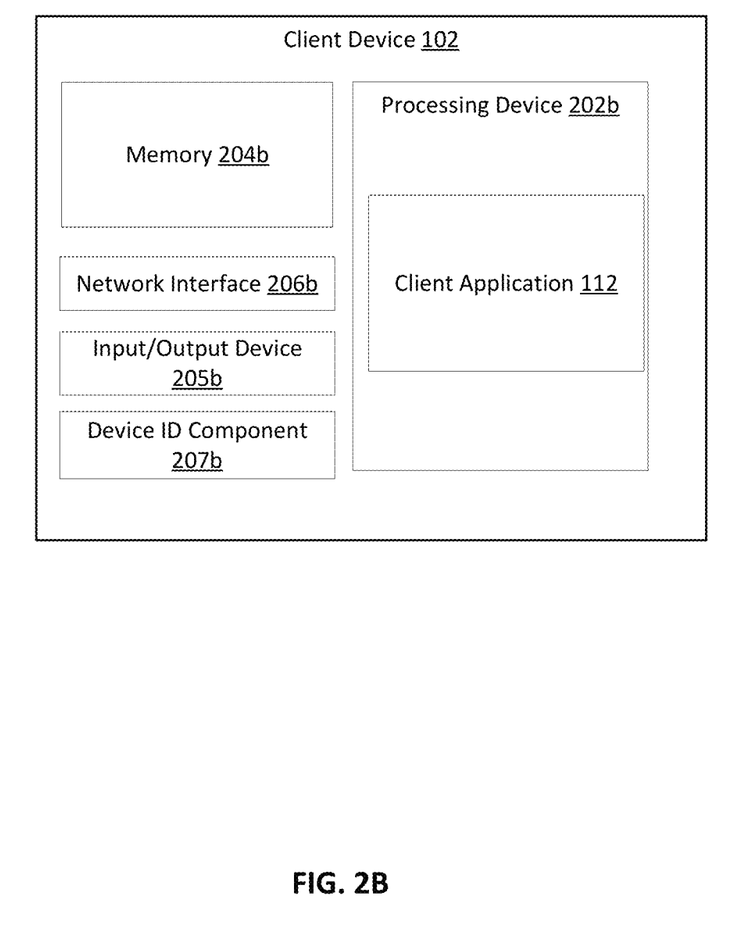
FIG. 2B is a block diagram depicting an example of the client device 102 of the environment in FIG. 1, according to some embodiments.

FIG. 2B is a block diagram depicting an example of the client device 102 of the environment in FIG. 1, according to some embodiments. While various devices, interfaces, and logic with particular functionality are shown, it should be understood that the client device 102 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The client device 102 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the client device 102 instead of devices and/or components of the host machine 104.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the client device 102 instead of devices and/or components of the host machine 104.

The processing device 202b may include and/or execute an application 112 (e.g., application 112a, application 112b) that is displayed on a computer screen of the client device 102. The application 112 may be any type of application, such as an operating system, a software driver for hardware (e.g., memory, video, motherboard), an internet/web browser, a graphic user interface (GUI), an email reader/client, a File Transfer Protocol (FTP) client, a virtual machine application, a desk-sharing application (e.g., configured in a server-mode or a client-mode), or a software application that is separate from an internet/web browser. The application 112 may be a particular brand (e.g., Microsoft, etc.), a particular version of the particular brand (MS Windows 10.2), include a particular service pack (Service Pack 1 for MS Windows 10), and/or rely on a particular database/library version. In some embodiments, the application 112 may be a container image, which is a standalone and executable package of software that includes everything (e.g., code, runtime, system tools, system libraries and settings) needed to run an application.

The client application 112 and/or the cloud administrator device 118 may be configured to communicate with the CS system 114 to cause one or more user-functions 136 to execute on the CS system 114. For example, at operation 302 of FIG. 3, the cloud administrator device 118 may configure the FMS sensor 145 as the external extension 140 of the runtime system 124 and the FMS initializer 132 as the internal extension 130 of the runtime system 124. In some embodiments, the cloud administrator device 118 may transmit one or more user-functions 136 to the CS system 114 to cause the CS system 114 to locally store the one or more user-functions 136.

At operation 304, the client device 102 transmits a request to the runtime system 124 to execute a user-function 136.

The client device 102 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the client device 102 instead of devices and/or components of the host machine 104.

The client device 102 includes an input/output device 205b configured to receive user input from and provide information to a user. In this regard, the input/output device 205b is structured to exchange data, communications, instructions, etc. with an input/output component of the client device 102. The input/output device 205b includes identical or nearly identical functionality as input/output device 205a in FIG. 2A, but with respect to devices and/or components of the client device 102 instead of devices and/or components of the host machine 104.

The client device 102 includes a device identification component 207b (shown in FIG. 2B as device ID component 207b) configured to generate and/or manage a device identifier associated with the client device 102. The device ID component 207b includes identical or nearly identical functionality as device ID component 207a in FIG. 2A, but with respect to devices and/or components of the client device 102 instead of devices and/or components of the host machine 104.

The client device 102 includes a bus (not shown), such as an address/data bus or other communication mechanism for communicating information, which interconnects the devices and/or components of the client device 102, such as processing device 202b, network interface 206b, input/output device 205b, and device ID component 207b.

In some embodiments, some or all of the devices and/or components of client device 102 may be implemented with the processing device 202b. For example, the client device 102 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

Figure 4:
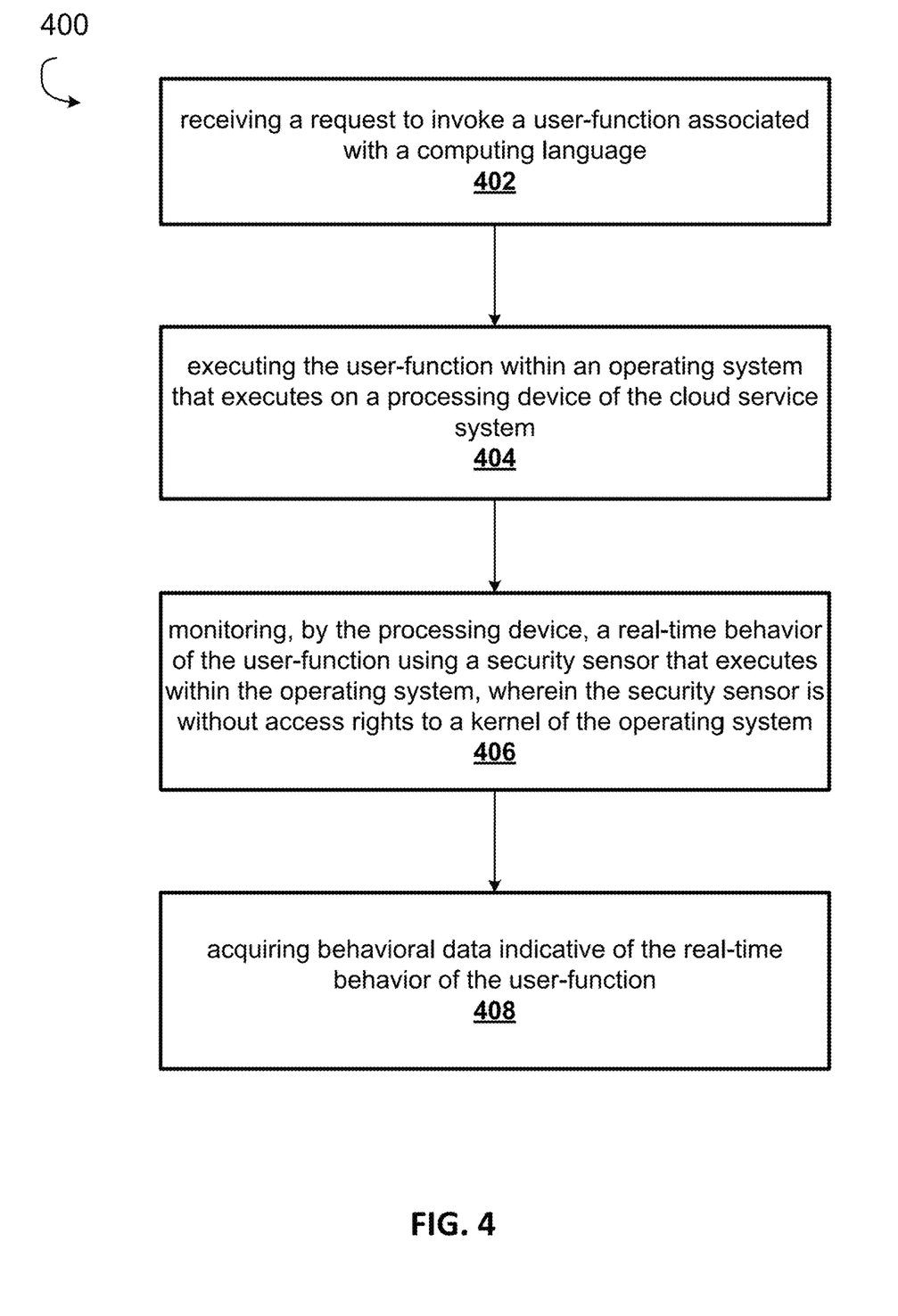
FIG. 4 is a flow diagram depicting a method of securing an FaaS cloud computing system without using access rights to operating system (OS) kernels of the cloud service system, according to some embodiments.

FIG. 4 is a flow diagram depicting a method for securing a FaaS cloud computing environment without using access rights to operating system (OS) kernels of the cloud service system, according to some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 400 may be performed by one or more host machines, such as host machines 104 in FIG. 1. In some embodiments, method 400 may be performed by a cloud service system, such as cloud service system 114 in FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

As shown in FIG. 4, the method 400 includes the block 402 of receiving a request to invoke a user-function associated with a computing language. The method 400 includes the block 404 of executing the user-function within an operating system that executes on a processing device of the cloud service system. The method 400 includes the block 406 of monitoring, by the cloud service system, a real-time behavior of the user-function using a security sensor that executes within the operating system, wherein the security sensor is without access rights to a kernel of the operating system. The method 400 includes the block 408 of acquiring behavioral data indicative of the real-time behavior of the user-function.

Figure 5:
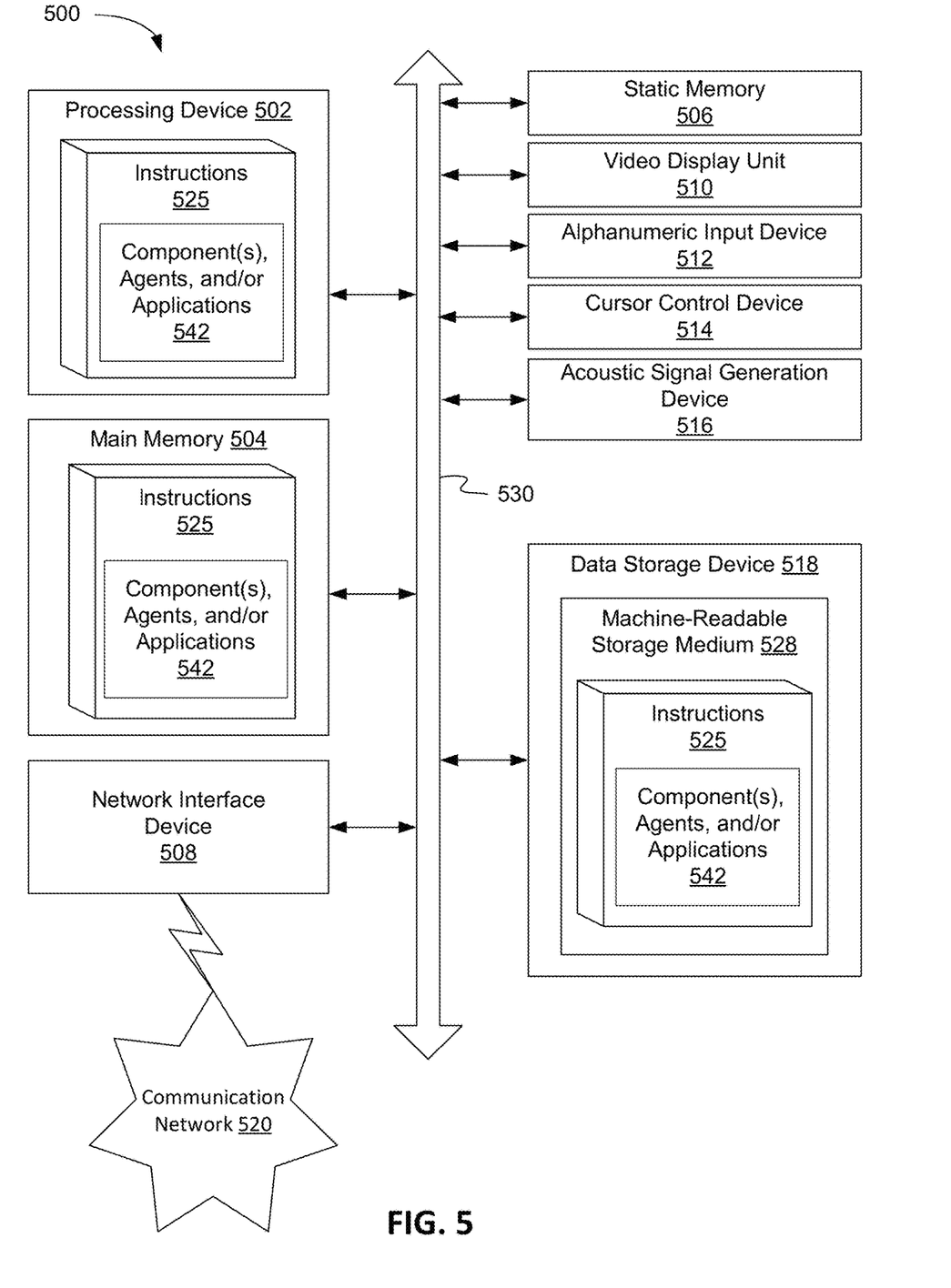
FIG. 5 is a block diagram of an example computing device 500 that may perform one or more of the operations described herein, in accordance with some embodiments.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for one or more components/agents/applications 542 (e.g., sandbox 201 in FIG. 2A, FMS sensor 145 in FIG. 2A, client application 112 in FIG. 2B, etc.) for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "executing," "monitoring," "acquiring," "generating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/ component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of monitoring events in a Function-as-a-Service (FaaS) cloud service system comprising a processing device, the method comprising:
   receiving a request to invoke a user-function associated with a computing language;
   executing the user-function within an operating system that executes on the processing device of the FaaS cloud service system;
   monitoring, by the processing device, a real-time behavior of the user-function using a security sensor that executes within the operating system, wherein the security sensor is without access rights to a kernel of the operating system;
   acquiring behavioral data indicative of the real-time behavior of the user-function;
   executing, within the operating system, a runtime software comprising an internal extension and an external extension; and
   launching, by the runtime software and to cause each to execute within the operating system, a sensor initializer that is registered as the internal extension and the security sensor that is registered as the external extension.

2. The method of claim 1, further comprising:
   determining, by the runtime software, that the sensor initializer is registered as the internal extension and the security sensor is registered as the external extension.

3. The method of claim 2, further comprising:
   configuring, by the sensor initializer, the security sensor to monitor at least one of a set of calls associated with the user-function or a set of calls associated with the operating system.

4. The method of claim 2, further comprising:
   identifying, by the sensor initializer, a first language runtime (LR) component from a plurality of LR components based on the computing language associated with the user-function;
   sending, by the sensor initializer, a second request for the security sensor to attach to the first LR component and the user-function; and
   attaching, by the security sensor responsive to receiving the second request, the security sensor to the first LR component and the user-function via a communication path to receive, via the communication path, the at least one of the set of calls associated with the user-function or the set of calls associated with the operating system.

5. The method of claim 2, further comprising:
   launching, by the security sensor responsive to attaching to the first LR component and the user-function, the first LR component to execute within the operating system;
   launching, by the first LR component, the user-function to execute within the operating system; and
   capturing, by the first LR component, at least the set of calls associated with the user-function or the set of calls associated with the operating system.

6. The method of claim 2, further comprising:
   receiving, by the security sensor from the first LR component, the at least one of the set of calls associated with the user-function or the set of calls associated with the operating system; and
   generating, by the security sensor, the behavioral data based on the at least one of the set of calls associated with the user-function or the set of calls associated with the operating system.

7. The method of claim 6, further comprising:
   transmitting, by the security sensor to a behavioral analysis system, the set of calls associated with the user-function or the set of calls associated with the operating system.

8. The method of claim 7, wherein the behavioral data indicates whether the user-function is engaging in malicious behavioral or non-malicious behavioral.

9. The method of claim 7, wherein transmitting, by the security sensor to the behavioral analysis system, the set of calls associated with the user-function or the set of calls associated with the operating system cause the behavioral analysis system to generate behavioral metrics based on the set of calls associated with the user-function or the set of calls associated with the operating system.

10. The method of claim 1, wherein the security sensor uses a seccomp component of a Linux kernel.

11. A Function-as-a-Service (FaaS) cloud service system comprising:
    a memory; and
    a processing device, operatively coupled to the memory, to:
       receive a request to invoke a user-function associated with a computing language;
       execute the user-function within an operating system of the FaaS cloud service system;
       monitor a real-time behavior of the user-function using a security sensor that executes within the operating system, wherein the security sensor is without access rights to a kernel of the operating system;
       acquire behavioral data indicative of the real-time behavior of the user-function;

execute, within the operating system, a runtime software comprising an internal extension and an external extension; and launch, by the runtime software and to cause each to execute within the operating system, a sensor initializer that is registered as the internal extension and the security sensor that is registered as the external extension.

12. The FaaS cloud service system of claim 11, wherein the processing device to:

determine, using the runtime software, that the sensor initializer is registered as the internal extension and the security sensor is registered as the external extension.

13. The FaaS cloud service system of claim 12, wherein the processing device to:

configure, using the sensor initializer, the security sensor to monitor at least one of a set of calls associated with the user-function or a set of calls associated with the operating system.

14. The FaaS cloud service system of claim 12, wherein the processing device to:

identify, using the sensor initializer, a first language runtime (LR) component from a plurality of LR components based on the computing language associated with the user-function;

send, using the sensor initializer, a second request for the security sensor to attach to the first LR component and the user-function; and attach, using the security sensor responsive to receiving the second request, the security sensor to the first LR component and the user-function via a communication path to receive, via the communication path, the at least one of the set of calls associated with the user-function or the set of calls associated with the operating system.

15. The FaaS cloud service system of claim 12, wherein the processing device to:

launch, using the security sensor responsive to attaching to the first LR component and the user-function, the first LR component to execute within the operating system;

launch, using the first LR component, the user-function to execute within the operating system; and capture, using the first LR component, at least the set of calls associated with the user-function or the set of calls associated with the operating system.

16. The FaaS cloud service system of claim 12, wherein the processing device to:

receive, using the security sensor from the first LR component, the at least one of the set of calls associated with the user-function or the set of calls associated with the operating system; and generate, using the security sensor, the behavioral data based on the at least one of the set of calls associated with the user-function or the set of calls associated with the operating system.

17. The FaaS cloud service system of claim 16, wherein the processing device to:

transmit, using the security sensor to a behavioral analysis system, the set of calls associated with the user-function or the set of calls associated with the operating system.

18. The FaaS cloud service system of claim 17, wherein the behavioral data indicates whether the user-function is engaging in malicious behavioral or non-malicious behavioral.

19. The FaaS cloud service system of claim 11, wherein the security sensor uses a seccomp component of a Linux kernel.

20. A non-transitory computer-readable medium storing instructions that, when executed by a processing device of a Function-as-a-Service (FaaS) cloud service system, cause the processing device to:

receive a request to invoke a user-function associated with a computing language;

execute the user-function within an operating system that executes on the processing device of the FaaS cloud service system;

monitor, by the processing device, a real-time behavior of the user-function using a security sensor that executes within the operating system, wherein the security sensor is without access rights to a kernel of the operating system;

acquire behavioral data indicative of the real-time behavior of the user-function;

execute, within the operating system, a runtime software comprising an internal extension and an external extension; and launch, by the runtime software and to cause each to execute within the operating system, a sensor initializer that is registered as the internal extension and the security sensor that is registered as the external extension.

* * * * *